United States Patent
Lantz et al.

(10) Patent No.: US 10,887,011 B2
(45) Date of Patent: *Jan. 5, 2021

(54) BEAM DIVERGENCE ADJUSTMENT OF A COMMUNICATION BEAM BASED ON STATE DISTURBANCE ESTIMATIONS

(71) Applicant: X Development LLC, Mountain View, CA (US)

(72) Inventors: Travis Lantz, Dublin, CA (US); Paul Csonka, Redwood City, CA (US); Bruce Moision, Palo Alto, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/867,814

(22) Filed: May 6, 2020

(65) Prior Publication Data

US 2020/0266889 A1  Aug. 20, 2020

Related U.S. Application Data

(63) Continuation of application No. 16/255,263, filed on Jan. 23, 2019, now Pat. No. 10,686,521.

(51) Int. Cl.
*H04B 10/00* (2013.01)
*H04B 10/079* (2013.01)
*H04B 10/112* (2013.01)

(52) U.S. Cl.
CPC ..... *H04B 10/07953* (2013.01); *H04B 10/112* (2013.01)

(58) Field of Classification Search
CPC ........ H04B 10/07953; H04B 10/07955; H04B 10/116; H04B 10/2507; H04B 10/675; H04B 10/07; H04B 10/112; H04B 10/0775; H04B 10/077; H04B 10/2537; H04B 10/11; H04B 10/60; H04B 10/564; H04B 3/54; H04B 3/52; H04B 1/0475; H04B 2203/5441; H04B 3/00; H04B 3/36;
(Continued)

(56) References Cited

U.S. PATENT DOCUMENTS 9,729,233 B2 *  8/2017  Nishino ........... H04B 10/07953
9,948,333 B2 *  4/2018  Henry ................. H04B 1/0475
(Continued)

*Primary Examiner* — Hibret A Woldekidan
(74) *Attorney, Agent, or Firm* — Botos Churchill IP Law LLP

(57) ABSTRACT

The disclosure provides for a communication system that includes one or more sensors and one or more processors. The one or more processors are configured to receive, during a first timeframe, a first indication of an error rate of a communication link, a second indication of an amount of received power at a remote communication system, and one or more measurements related to the state of the communication system. The one or more processors are then configured to estimate a plurality of disturbance values to the communication system according to the one or more measurements and the second indication. Each disturbance value is associated with a set of components of the communication system. The one or more processors are configured to adjust a beam divergence of a beacon beam or a communication beam transmitted from the communication system based on the plurality of disturbance values and the first indication.

20 Claims, 5 Drawing Sheets

(58) Field of Classification Search
CPC ...... H04B 3/58; H04B 7/0617; H04B 17/318; H04L 12/6418
USPC .................................. 398/25–27, 33, 38
See application file for complete search history.

(56) References Cited

U.S. PATENT DOCUMENTS

| | | | | |
|---|---|---|---|---|
| 10,135,527 | B1* | 11/2018 | Csonka | H04B 10/11 |
| 10,158,383 | B2* | 12/2018 | Henry | H04B 3/54 |
| 10,205,655 | B2* | 2/2019 | Barzegar | H04L 45/24 |
| 10,291,365 | B2* | 5/2019 | Moision | H04L 1/188 |
| 2004/0141253 | A1* | 7/2004 | Funawatari | G06F 1/1632 360/99.14 |
| 2004/0179848 | A1* | 9/2004 | Belenkii | H04B 10/112 398/131 |
| 2006/0159451 | A1* | 7/2006 | Tanaka | H04B 10/2507 398/38 |
| 2010/0067904 | A1* | 3/2010 | Brodsky | H04B 10/07953 398/26 |
| 2010/0135654 | A1* | 6/2010 | Pincemin | G01M 11/33 398/25 |
| 2011/0268453 | A1* | 11/2011 | Fest | G01S 7/499 398/129 |
| 2015/0215041 | A1* | 7/2015 | Pechner | H03M 13/3769 398/130 |
| 2017/0018174 | A1* | 1/2017 | Gerszberg | H04L 12/1845 |
| 2018/0191431 | A1* | 7/2018 | Moision | H04L 1/1874 |
| 2018/0234180 | A1* | 8/2018 | Takahashi | H04B 10/116 |
| 2019/0020401 | A1* | 1/2019 | Gharavi | H04B 7/15 |
| 2019/0165815 | A1* | 5/2019 | Moision | H03M 13/2906 |
| 2019/0222360 | A1* | 7/2019 | Nam | H04L 1/1812 |

* cited by examiner

400

BEAM DIVERGENCE ADJUSTMENT OF A COMMUNICATION BEAM BASED ON STATE DISTURBANCE ESTIMATIONS

CROSS REFERENCE TO RELATED APPLICATIONS

This application is a continuation of U.S. patent application Ser. No. 16/255,263, filed Jan. 23, 2019, the disclosures of which are hereby incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The mechanisms of communication terminals may vary physically due to differences in operation over time. For example, mechanisms may be cycled through large temperature ranges and experience significantly varying plant (mechanism) characteristics. Mechanisms may wear with use, which may change friction and viscosity characteristics. Mechanisms may also have components that reduce performance using traditional controls techniques. In these situations, it may be difficult to compensate for the variability caused by the changes in the components in order to obtain reliable operation of a communication terminal.

BRIEF SUMMARY

Aspects of the disclosure provide for a communication system. The communication system includes one or more sensors configured to receive measurements related to a state of the communication system and one or more processors in communication with the one or more sensors. The one or more processors are configured to receive a first indication of an error rate of a communication link between the communication system and a remote communication system during a first timeframe; receive, from the remote communication system, a second indication of an amount of received power at the remote communication system during the first timeframe; receive, from the one or more sensors, one or more measurements related to the state of the communication system during the first timeframe; estimate a plurality of disturbance values to the communication system for the first timeframe and a second timeframe according to the one or more measurements and the second indication, the second timeframe being smaller than the first timeframe, each disturbance value being associated with a set of components of the communication system; and adjust a beam divergence of a beacon beam or a communication beam transmitted from the communication system for the communication link based on the plurality of disturbance values and the first indication.

In one example, the one or more processors are configured to estimate the plurality of disturbance values based on a first disturbance value estimated by determining an average amount of change of the indication over the second timeframe equal to or on the same order of the first timeframe; and a second disturbance value estimated by subtracting the first disturbance value from the received indication and then determining an average amount of change of the indication over a third timeframe less than the second timeframe. In another example, the one or more processors are configured to estimate the plurality of disturbance values based on a set of components associated with each disturbance value. In this example, the one or more processors are further configured to identify the set of components based on a determination that a time constant for a variation of the component is equivalent to the timeframe for an estimated disturbance value; a determination that a detected change in the received one or more measurements associated with the component is a most likely cause of an estimated disturbance value; or an identification of a known change in behavior of a component associated with the received one or more measurements.

In a further example, the one or more processors are configured to adjust the beam divergence of the beacon beam or the communication beam by increasing the beam divergence proportional to an increase in the plurality of disturbance values. In yet another example, the one or more processors are configured to adjust the beam divergence of the beacon beam or the communication beam by decreasing the beam divergence when the first indication exceeds a set threshold. In a still further example, the system is a free-space optical communication system that is configured to transmit an optical outbound signal to the remote communication system and to receive an optical inbound signal from the remote communication system.

Other aspects of the disclosure provide for a method for adjusting a beam divergence of a beacon beam or a communication beam transmitted by a communication device. The method includes receiving, by one or more processors of the communication device, a first indication of an error rate of a communication link between the communication device and a remote communication device during a first timeframe; receiving, by the one or more processors, a second indication of an amount of received power at the remote communication device during the first timeframe; receiving, by the one or more processors, one or more measurements related to a state of the communication device during the first timeframe; estimating, by the one or more processors, a plurality of disturbance values to the communication device for the first timeframe and a second timeframe according to the one or more measurements and the second indication, the second timeframe being smaller than the first timeframe, each disturbance value being associated with a set of components of the communication device; and adjusting, by the one or more processors, a beam divergence of a beacon beam or a communication beam transmitted from the communication device for the communication link based on the plurality of disturbance values and the first indication.

In one example, estimating the plurality of disturbance values includes estimating a first disturbance value by determining an average amount of change of the second indication over the second timeframe equal to or on the same order of the first timeframe; and estimating a second disturbance value may by subtracting the first disturbance value from the second indication and then determining an average amount of change of the second indication over a third timeframe less than the second timeframe. In another example, estimating the plurality of disturbance values includes identifying a set of components associated with each disturbance value. In this example, identifying the set of components includes determining that a time constant for a variation of the component is equivalent to the timeframe for an estimated disturbance value; determining that a detected change in the received one or more measurements associated with the component is a most likely cause of an estimated disturbance value; or identifying a known change in behavior of a component associated with the received one or more measurements.

In a further example, adjusting the beam divergence of the beacon beam or the communication beam includes increasing the beam divergence proportional to an increase in the plurality of disturbance values. In yet another example, adjusting the beam divergence of the beacon beam or the communication beam includes decreasing the beam divergence when the first indication exceeds a set threshold. In a still further example, the method also includes receiving, by the one or more processors, an updated indication; estimating, by the one or more processors, one or more updated disturbance values based on the updated indication; and adjusting, by the one or more processors, a given component based on the one or more updated disturbance values.

Further aspects of the disclosure provide for a method for adjusting a beam divergence of a beacon beam or a communication beam transmitted by a communication device. The method includes receiving, by one or more processors of the communication device, a first indication of an error rate of a communication link between the communication device and a remote communication device during a first timeframe; receiving, by the one or more processors, a second indication of an amount of pointing error of the beacon beam or the communication beam that is received at the remote communication device during the first timeframe; receiving, by the one or more processors, one or more measurements related to a state of the communication device during the first timeframe; estimating, by the one or more processors, a plurality of pointing disturbance values to the communication device for the first timeframe and a second timeframe according to the one or more measurements and the second indication, the second timeframe being smaller than the first timeframe, each pointing disturbance value being associated with a set of components of the communication device; and adjusting, by the one or more processors, a beam divergence of a beacon beam or a communication beam transmitted from the communication device for the communication link based on the plurality of pointing disturbance values and the first indication.

In one example, estimating the plurality of pointing disturbance values includes estimating a first disturbance value by determining an average amount of change of the second indication over the second timeframe equal to or on the same order of the first timeframe; and estimating a second disturbance value may by subtracting the first disturbance value from the second indication and then determining an average amount of change of the second indication over a third timeframe less than the second timeframe. In another example, estimating the plurality of pointing disturbance values includes identifying a set of components associated with each pointing disturbance value. In this example, identifying the set of components includes determining that a time constant for a variation of the component is equivalent to the timeframe for an estimated disturbance value; determining that a detected change in the received one or more measurements associated with the component is a most likely cause of an estimated disturbance value; or identifying a known change in behavior of a component associated with the received one or more measurements.

In a further example, adjusting the beam divergence of the beacon beam or the communication beam includes increasing the beam divergence proportional to an increase in the plurality of pointing disturbance values. In yet another example, adjusting the beam divergence of the beacon beam or the communication beam includes decreasing the beam divergence when the first indication exceeds a set threshold.

DETAILED DESCRIPTION

Overview

The technology relates to a communication system configured to adjust a divergence angle for a beacon beam or a communication beam. The divergence angle for the beacon or communication beam may be adjusted to be wider when conditions at and around the communication system cause a decreased ability to track the beam. For example, when the communication system has big fluctuations or when obstacles block portions of the link, smaller portions of a transmitted beam may be received at a remote communication system. On the other hand, the divergence angle may be adjusted to be narrower when the conditions are better to conserve power.

The features described in more detail below provide for a communication system that is able to maintain a communication link with a remote communication system at a more consistent received power. By identifying components that cause a given disturbance, adjustments may be made that more efficiently address the disturbance over time. As a result, system availability and data throughput over a communication link may be increased, and a tracking system may have a better lock on the communication link. The tracking system of the communication system may be operated more accurately, especially at close range, such that less power is needed to maintain a lock on a communication link.

In addition, more accurate predictions may be made regarding overall performance of the communication system and adjustments to the communication system. There may be less heat generation, so the overall temperature of the system allows the components of the system to perform more optimally. The communication system may be more power efficient and therefore have a longer operating lifetime. The communication system's power output may also more accurately stay in the dynamic range of the sensors on the receiving end, which may prevent sensor damage that can occur with cases of saturation.

Example Systems

Figure 1:
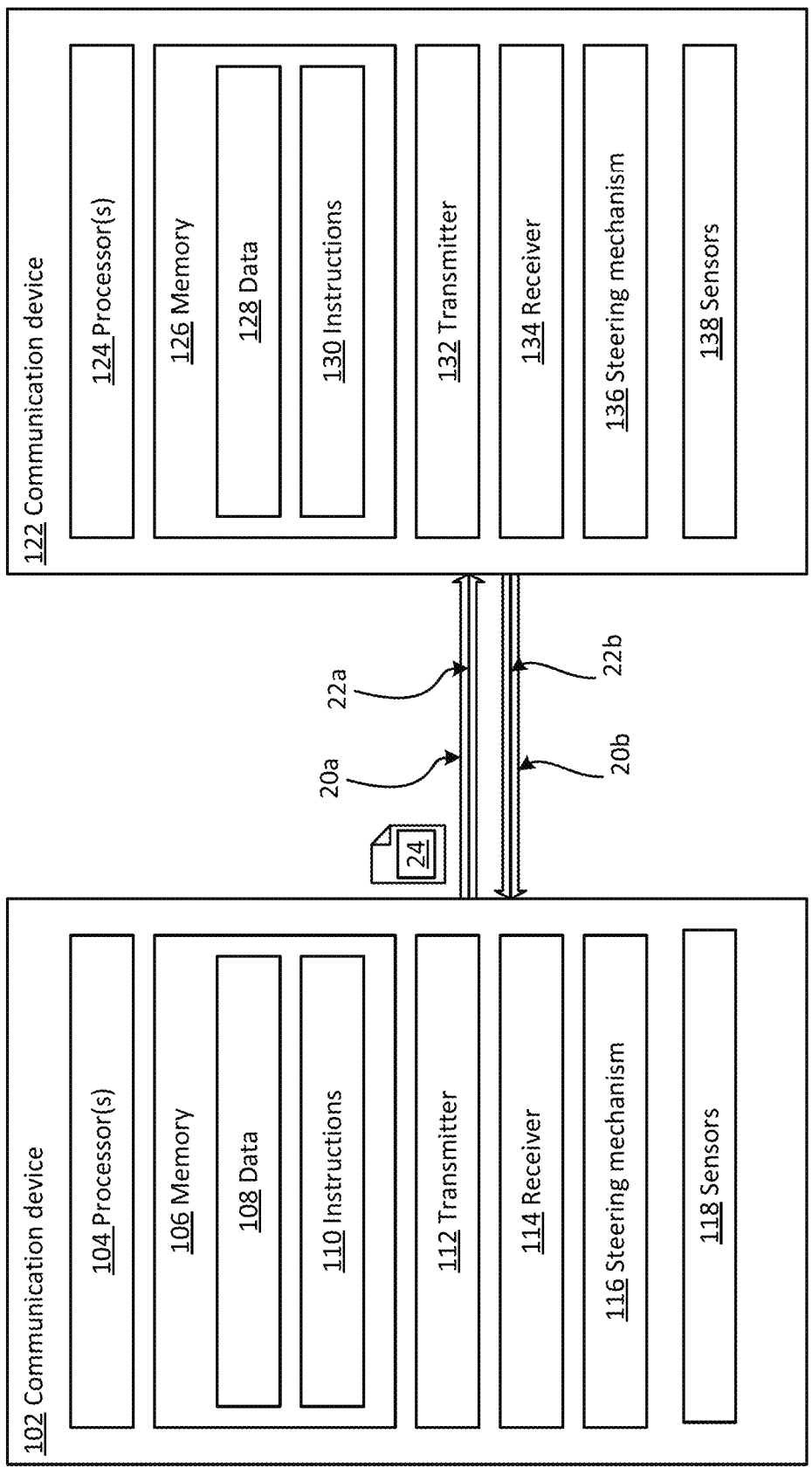
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

Figure 2:
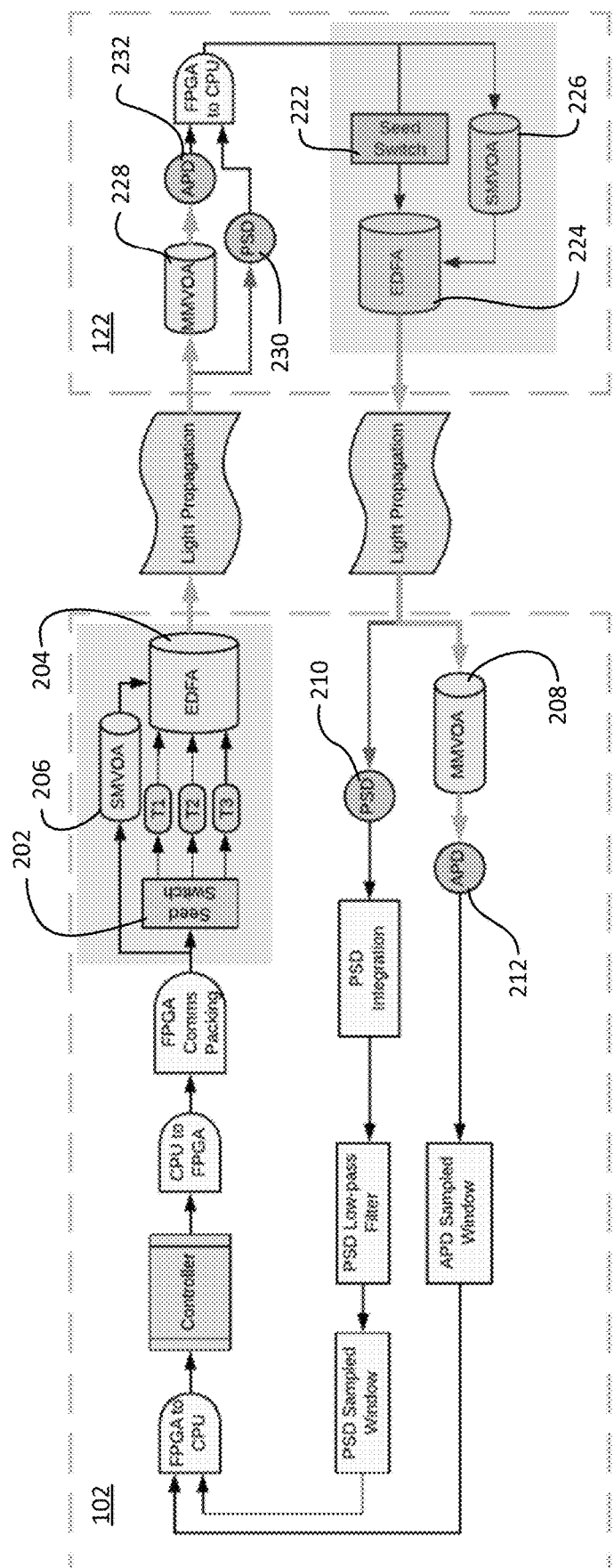
FIG. 2 is a pictorial diagram of components of the first communication device and the second communication device in accordance with aspects of the disclosure.

The transmitter 112 may include an optical transmitter, an amplifier, and an attenuator. As shown in FIG. 2, the transmitter 112 includes a seed laser 202 configured to provide an amount of bandwidth for an output signal, an EDFA 204 configured to increase an amplitude of the output signal, and a single mode variable optical attenuator (SMVOA) 206 configured to decrease the amplitude of the output signal. In addition, as shown in FIG. 1, the transmitter 112 may be configured to output a beacon beam 20 that allows one communication device to locate another, as well as a communication signal over a communication link 22. The output signal from the transmitter 112 may therefore include the beacon beam 20, the communication signal, or both. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal.

The beacon beam 20 may illuminate a larger solid angle in space, or a larger beam divergence, than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian. Furthermore, the transmitter 112 may be configured to adjust the beam divergence of the beacon beam and/or the optical communication beam, which would adjust the covered angular area of the respective beam(s). For adjusting the beam divergence, the transmitter 112 may include an adjustable lens system. The adjustable lens system may be configured for mechanical movement of one or more lenses of the lens system. In other examples, the adjustable lens system may include a liquid lens that is adjustable by rotation or non-mechanical means.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower beam divergence than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

The receiver 114 includes a tracking system configured to detect an optical signal. As shown in FIG. 2, the receiver 114 for the optical communication system may include a multi-mode variable optical attenuator 208 configured to adjust an amplitude of a received signal, a photosensitive detector 210, and/or a photodiode 212. Using the photosensitive detector 210, the receiver 114 is able to detect a signal location and convert the received optical signal into an electric signal using the photoelectric effect. The receiver 114 is able to track the received optical signal, which may be used to direct the steering mechanism 116 to counteract disturbances due to scintillation and/or platform motion.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, or estimators, may be configured to monitor a state of the first communication device 102. The one or more sensors may include an inertial measurement unit (IMU), encoders, accelerometers, or gyroscopes and may include one or more sensors configured to measure one or more of pose, angle, velocity, torques, as well as other forces. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include an optical transmitter, an amplifier, and an attenuator. As shown in FIG. 2, the transmitter 132 includes a seed laser 222 configured to provide an amount of bandwidth for an output signal, an EDFA 224 configured to increase an amplitude of the output signal, and a single mode variable optical attenuator (SMVOA) 226 configured to decrease the amplitude of the output signal. Additionally, as shown in FIG. 1, transmitter 132 may be configured to output both an optical communication beam and a beacon beam and to adjust the beam divergence of one or both. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower beam divergence than the beacon beam and carries another communication signal. As such, when the first communication device 102 receives the beacon beam 20a, the first communication device 102 may establish a line-of-sight link with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes a tracking system configured to detect an optical signal as described above with respect to receiver 114. As shown in FIG. 2, the receiver 114 for the optical communication system may include a multi-mode variable optical attenuator 228 configured to adjust an amplitude of a received signal, a photosensitive detector 230, and/or a photodiode 232. Other components similar to those pictured in the first communication device 102 may also be included in the second communication device 122. Using the photosensitive detector 230, the receiver 134 is able to detect a signal location and convert the received optical signal into an electric signal using the photoelectric effect. The receiver 134 is able to track the received optical signal, which may be used to direct the steering mechanism 136 to counteract disturbances due to scintillation and/or platform motion.

Returning to FIG. 1, the one or more processors 124 are in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 3:
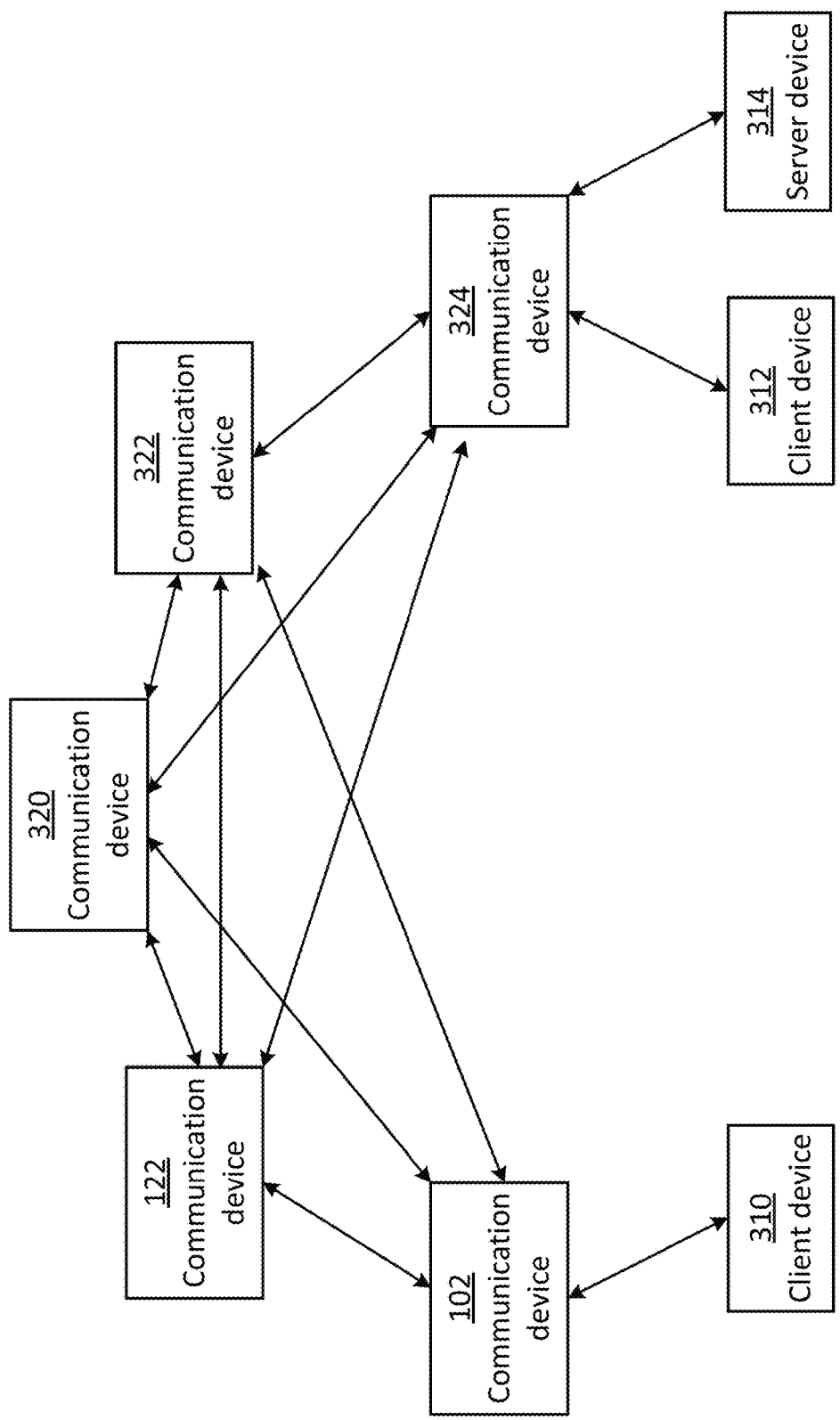
FIG. 3 is a pictorial diagram of a network 300 in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 300. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transmitter, a receiver, and a steering mechanism similar to those described above. Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network.

Example Methods

Figure 4:
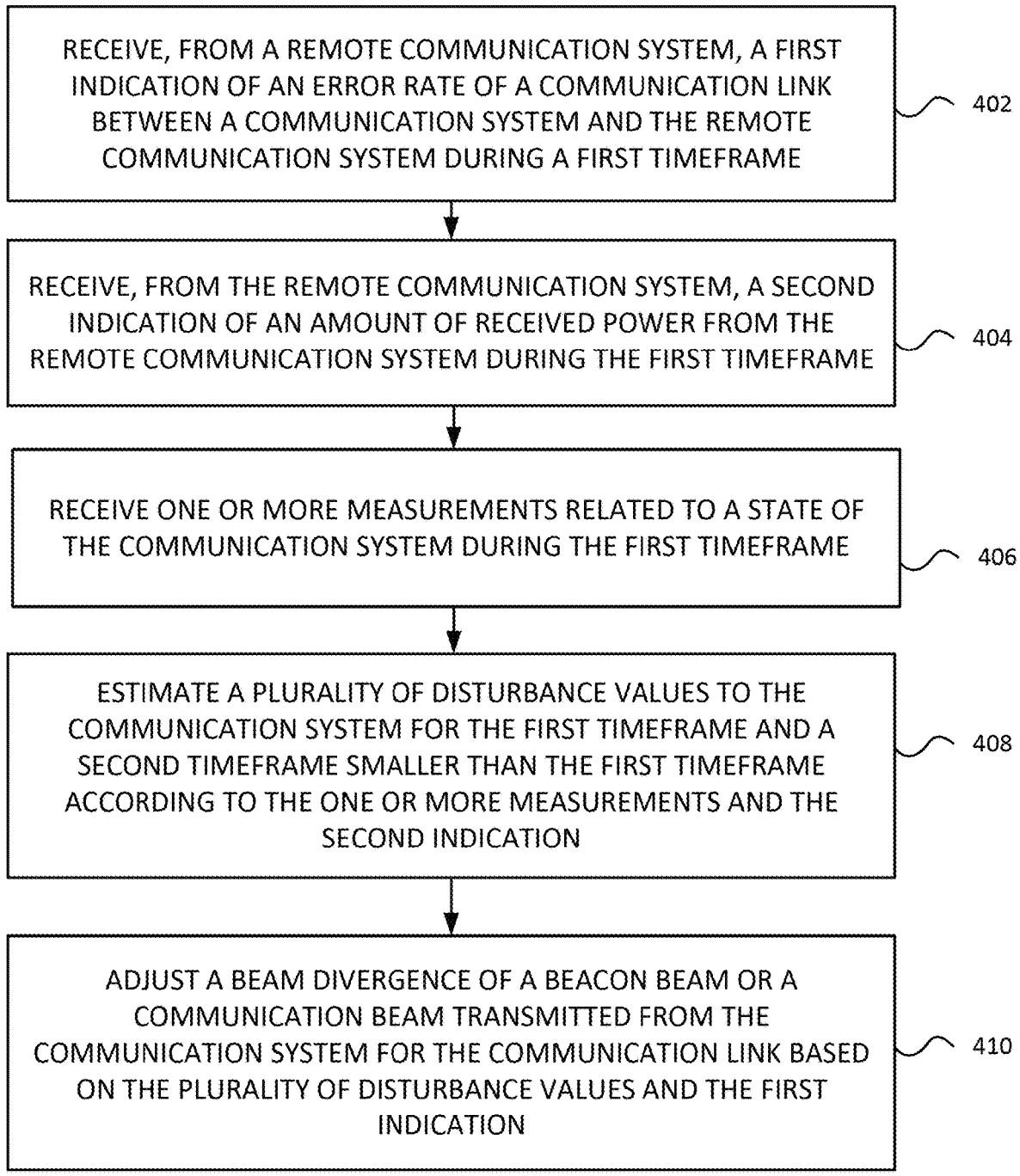
FIG. 4 is a flow diagram 400 depicting a method in accordance with aspects of the disclosure.
Figure 5:
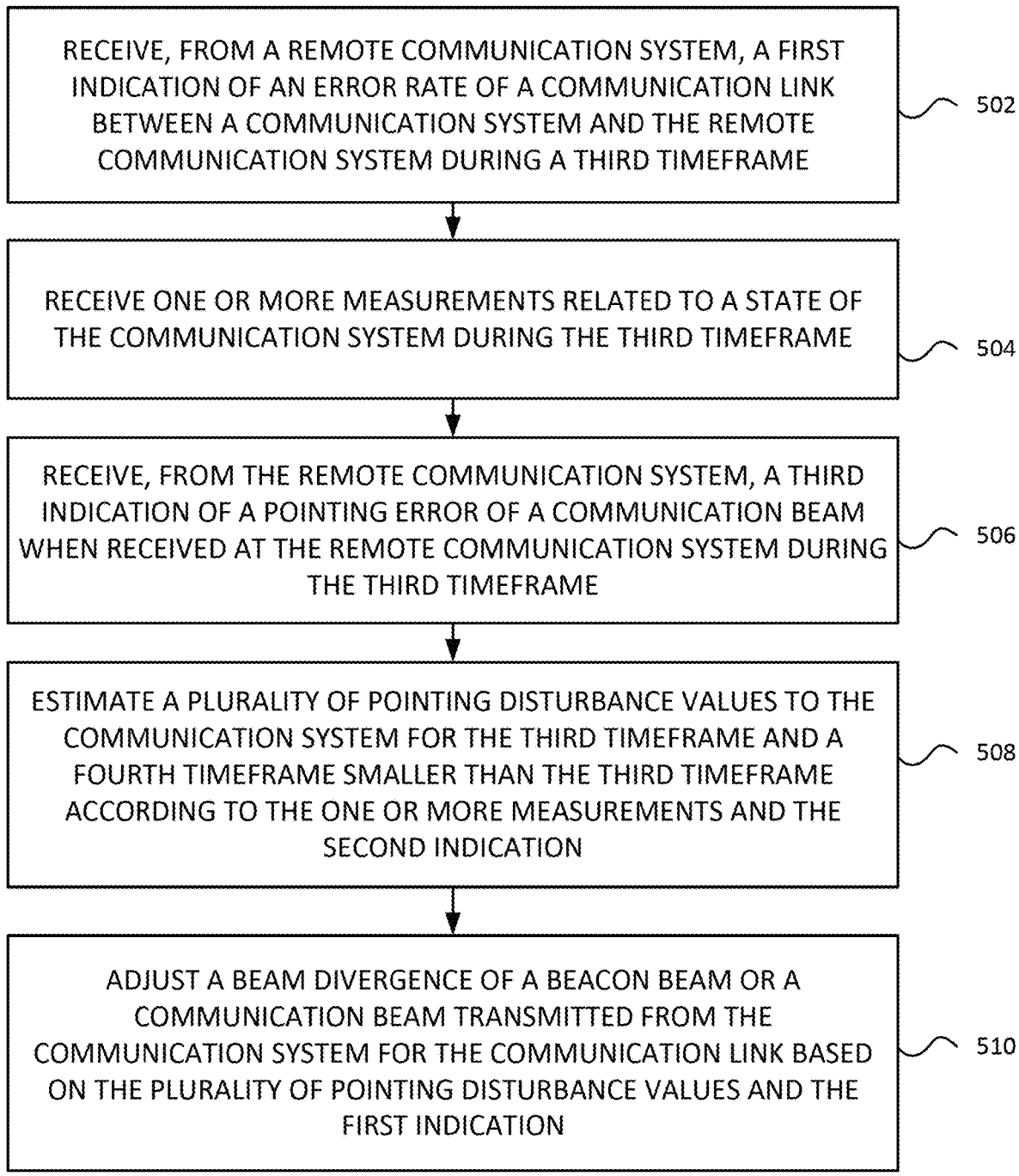
FIG. 5 is a flow diagram 500 depicting another method in accordance with aspects of the disclosure.

While connected, the one or more processors 104 of the first communication device 102 may adjust beam divergence of a beacon beam and/or a communication beam for a communication link with a remote communication device, such as the second communication device 122, as described below and shown in the flowchart in FIGS. 4 and 5. In other implementations, the one or more processors 124 of the second communication device 122 may be configured to adjust beam divergence of a beacon beam and/or a communication beam in a same or similar manner. In FIG. 4, flow diagram 400 is shown in accordance with aspects of the disclosure that may be performed by the one or more processors 104 and/or the one or more processors 124. While FIG. 4 shows blocks in a particular order, the order may be varied and that multiple operations may be performed simultaneously. Also, operations may be added or omitted.

At block 402, the one or more processors 104 receive a first indication of an effectiveness of the communication link 22 from the second communication device 122 during a first timeframe. The indication may be an error rate or other type of measurement. The indication may be received via an optical signal, a RF signal, etc., from the second communication device 122. The indication may be received continually or at regular intervals, such as every 0.1 seconds or more or less. Each indication may be stored in the memory 106 of the first communication device 102. The first timeframe may be on the order of days, weeks or months, or more or less.

At block 404, the one or more processors 104 also receive a second indication of an amount of received power for the communication link 22 from the second communication device 122 during the first timeframe. The indication may be a relative received signal strength indicator or other type of measurement. The indication may be received via an optical signal, a RF signal, etc. from the second communication device 122. The indication may be received continually or at regular intervals, such as every 0.1 seconds or more or less. Each indication may be stored in the memory 106 of the first communication device 102.

At block 406, the one or more processors 104 also receive measurements related to a state of the first communication device 102 during the first timeframe. The measurements may be received from the one or more sensors 118 of the first communication device 102 and may include, for example, orientation of the first communication device, frequency of vibration of the first communication device, output power, altitude, humidity, temperature, etc. The measurements may be received continually or at regular intervals, such as every 0.1 seconds or more or less. Each measurement may be stored in the memory 106 of the first communication device.

At block 408, the one or more processors 104 estimate one or more disturbance values to the first communication device 102 according to the second indication and the received measurements. Each disturbance value may be an average amount of change in power over a given timeframe. A first disturbance value may be estimated by determining an average amount of change of the indication over a second timeframe, for instance which is equal to or on the same order of the first timeframe. The second timeframe may be selected according to a first time constant for variation of a component of the first communication device 102. The first time constant may be the amount of time over which a measurement related to the component changes by a predetermined factor, such as a factor of 1-1/e (or approximately 0.6321). The first time constant may be known or may be determined using the received measurements. In particular, the first time constant may be a known or predicted time constant for a degradation, or decay, of the component. The second timeframe may be equal to the first time constant. For example, the second timeframe may be a month, which may be the time constant for a degradation of the transmitter hardware or individual components of the transmitter hardware, such as the photodiode detector, the EDFA and/or the seed laser, by a factor of 1-1/e.

Then, a second disturbance value may be estimated by subtracting the first disturbance value from the received indication and then determining an average amount of change of the power over a third timeframe that is less than the second timeframe. The third timeframe may be selected according to a second time constant for variation of another component of the first communication device 102. The second time constant may be the amount of time over which a measurement related to the other component changes by the same predetermined factor, such as a factor of 1-1/e. The third timeframe may be equal to the second time constant. Additional disturbance values for additional timeframes may be determined in a similar manner.

Estimating the one or more disturbance values may include identifying one or more components of the first communication device 102 to be associated with each disturbance value. The identification of a component may include determining that a time constant for the variation of the component is equivalent to the timeframe for an estimated disturbance value. Equivalence may be, for example, within 10% more or less than the time frame for the estimated disturbance value. Other ranges may be used in other implementations. For instance, a known or predicted time constant for the degradation of the component may be the same as the timeframe for the estimated disturbance value. The identification of a component may also including determining that a detected change in the received measurements associated with the component is a most likely cause of an estimated disturbance value. For example, the detected change may occur in the same timeframe as the estimated disturbance value. In addition, the identification of a component may include identifying a known change in behavior of a component associated with a received measurement, such as differences in an amount of output due to altitude, temperature, humidity, or other type of environmental measurement.

At block 410, the one or more processors 104 adjust a beam divergence of the beacon beam using the transmitter 112 according to the one or more disturbance values and the first indication. Adjusting the beam divergence may be, as the one or more disturbance values increase, increasing the beam divergence of the beacon beam proportional to the increase in the one or more disturbance values. By increasing the beam divergence, the beacon beam may be operating as if the second communication device 122 is at a farther distance than the actual distance of the second communication device 122, which may be allow for reduction of near-field diffraction or other near-field behavior and for improved tracking performance. However, when the first indication related to the effectiveness of the communication link meets or exceeds a set threshold for a set amount of time, the adjustment may be decreasing the beam divergence of the beacon beam incrementally until the first indication is below the set threshold. When the one or more disturbance values decrease, the adjustment may be decreasing the beam divergence of the beacon beam proportional to the decrease in the one or more disturbance values.

In some implementations, after the beam divergence of the beacon beam is adjusted at the first communication device 102, the one or more processors 124 of the second communication device 122 may adjust a beam divergence of a beacon beam transmitted from the second communication device 122. The beam divergence of the beacon beam may be performed using the transmitter 132. The beam divergence may be adjusted according to one or more disturbance values and a first indication determined at the second communication device 122 or may match the beam divergence of the first communication device 102. Adjustments may be made at other communication devices in the network 300 in series. In some examples, after the beam divergence of the beacon beam is adjusted at the second communication device 122, the one or more processors 104 may readjust the beam divergence of the beacon beam transmitted from the first communication device 102 in a same or similar manner as described above. This process may be repeated to refine the beam divergence at each communication device over time.

For adjusting a communication beam, the beam divergence may be adjusted in a same way as described above with respect to the beacon beam in block 410.

Additionally or alternatively, the beam divergence of the beacon beam and/or the communication beam may be adjusted by estimating one or more pointing disturbance values based on a pointing error. In FIG. 5, flow diagram 500 is shown in accordance with aspects of the disclosure that may be performed by the one or more processors 104 and/or the one or more processors 124. While FIG. 5 shows blocks in a particular order, the order may be varied and that multiple operations may be performed simultaneously. Also, operations may be added or omitted.

At block 502, the one or more processors 104 receive the first indication of the error rate of the communication link 22 during a third timeframe in the same manner as described in block 402 above. At block 504, the one or more processors 104 receive the one or more measurements related to the state of the first communication device during the third time frame in a same manner as described in block 406 above.

At block 506, the one or more processors 104 also receive a third indication related to a pointing error of the beacon beam or the communication beam when received at the second communication device 122 during the third timeframe. The third indication may be related to a distance of the beacon beam or the communication beam from a target location of a detector of the second communication device 122 when the beacon beam or the communication beam is received at the detector. The indication may be received via an optical signal, an RF signal, etc., from the second communication device 122. The indication may be received continually or at regular intervals, such as every 0.1 seconds or more or less. Each indication may be stored in the memory 106 of the first communication device 102. The first timeframe may be on the order of days, weeks or months, or more or less.

At block 508, the one or more processors 104 estimate one or more pointing disturbance values to the first communication device 102 according to the third indication and the received measurements. Each pointing disturbance value may be an average amount of change in distance from the target location of the detector over a given timeframe. A first pointing disturbance value may be estimated by determining an average amount of change of the indication over a fourth timeframe equal to or on the same order of the first timeframe. The fourth timeframe may be selected according to a third time constant for variation of a component of the first communication device 102. The third time constant may be known or may be determined using the received measurements. For example, the fourth timeframe may be a month, which may be associated with a time constant for an amount of drift of according to received orientation measurements for the first communication device 102.

Then, a second pointing disturbance value may be estimated by subtracting the first pointing disturbance value from the received indication and then determining an average amount of change of the distance over a fifth timeframe less than the fourth timeframe. The fifth timeframe may be selected according to a known time constant for variation of a component of the first communication device 102. Additional disturbance values for additional timeframes may be determined in a similar manner.

At block 510, the one or more processors may then adjust the beam divergence of the beacon beam or the communication beam according to the one or more pointing disturbance values and the first indication in a same or similar manner as described above with respect to block 410.

Alternatively, the one or more processors 104 may determine no adjustment is needed for the beacon beam or the communication beam when no component is identified as being associated with the one or more disturbance values. No component may be identified when the disturbance to the received indication has characteristics associated with an obstacle between the first communication device 102 and the second communication device 122. For example, the characteristics may include some fraction of the initial signal drop during the fade was steeper than a threshold, the signal power has dropped below to a set minimum threshold, or the signal power has remained below the set threshold for a certain amount of time. The one or more processors 104 may pause some operations related to the communication link to conserve energy while the obstacle is detected, determine when an obstacle is gone, and resume operation.

In some implementations, the one or more processors 104 may also predict a future disturbance value associated with one or more components based on the received measurements and/or predicted behavior of the one or more components over time. For example, a vibration or shake of the first communication device 102 may be predicted to increase over time at a given rate, and the future disturbance value may be determined based on the predicted increase. An amount of wind may be predicted based on weather forecasts or environmental data from the one or more sensors, in which case the future disturbance value may be determined based on the predicted amount of wind. Based on the future disturbance value, the one or more processors 104 may schedule adjustments to the beam divergence of the beacon beam and/or the communication beam.

The features described in more detail below provide for a communication system that is able to maintain a communication link with a remote communication system at a more consistent received power. By identifying components that cause a given disturbance, adjustments may be made that more efficiently address the disturbance over time. As a result, system availability and data throughput over a communication link may be increased, and a tracking system may have a better lock on the communication link. The tracking system of the communication system may be operated more accurately, especially at close range, such that less power is needed to maintain a lock on a communication link.

In addition, more accurate predictions may be made regarding overall performance of the communication system and adjustments to the communication system. There may be less heat generation, so the overall temperature of the system allows the components of the system to perform more optimally. The communication system may be more power efficient and therefore have a longer operating lifetime.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication system comprising:
one or more processors in communication, the one or more processors being configured to:
receive an indication of an amount of received power at a remote communication system during a first timeframe;
estimate a plurality of disturbance values to the communication system for the first timeframe and a second timeframe according to the indication and one or more measurements related to a state of the communication system during a first timeframe, the second timeframe being smaller than the first timeframe, each disturbance value being associated with a set of components of the communication system; and
adjust a beam divergence of a beam transmitted from the communication system for the communication link based on the plurality of disturbance values.

2. The system of claim 1, wherein the one or more processors are configured to estimate the plurality of disturbance values based on:
a first disturbance value estimated by determining an average amount of change of the indication over the second timeframe equal to or on the same order of the first timeframe; and
a second disturbance value estimated by subtracting the first disturbance value from the received indication and then determining an average amount of change of the indication over a third timeframe less than the second timeframe.

3. The system of claim 1, wherein the one or more processors are configured to estimate the plurality of disturbance values based on a set of components associated with each disturbance value.

4. The system of claim 3, wherein the one or more processors are further configured to identify the set of components based on:
a determination that a time constant for a variation of the component is equivalent to the timeframe for an estimated disturbance value;
a determination that a detected change in the one or more measurements associated with the component is a most likely cause of an estimated disturbance value; or
an identification of a known change in behavior of a component associated with the one or more measurements.

5. The system of claim 1, wherein the one or more processors are configured to adjust the beam divergence of the beam by increasing the beam divergence proportional to an increase in the plurality of disturbance values.

6. The system of claim 1, wherein the one or more processors are configured to adjust the beam divergence of the beam by decreasing the beam divergence when the indication exceeds a set threshold.

7. The system of claim 1, wherein the system is a free-space optical communication system that is configured to transmit an optical outbound signal to the remote communication system and to receive an optical inbound signal from the remote communication system.

8. A method for adjusting beam divergence, the method comprising:
receiving, by one or more processors, an indication of an amount of received power at a remote communication device during a first timeframe;
estimating, by the one or more processors, a plurality of disturbance values to the communication device for the first timeframe and a second timeframe according to the indication and one or more measurements related to a state of the communication device during the first timeframe, the second timeframe being smaller than the first timeframe, each disturbance value being associated with a set of components of the communication device; and adjusting, by the one or more processors, a beam divergence of a beam transmitted from the communication device for the communication link based on the plurality of disturbance values.

9. The method of claim 8, wherein estimating the plurality of disturbance values includes:
estimating a first disturbance value by determining an average amount of change of the indication over the second timeframe equal to or on the same order of the first timeframe; and
estimating a second disturbance value may by subtracting the first disturbance value from the indication and then determining an average amount of change of the indication over a third timeframe less than the second timeframe.

10. The method of claim 8, wherein estimating the plurality of disturbance values includes identifying a set of components associated with each disturbance value.

11. The method of claim 10, wherein identifying the set of components includes:
determining that a time constant for a variation of the component is equivalent to the timeframe for an estimated disturbance value;
determining that a detected change in the one or more measurements associated with the component is a most likely cause of an estimated disturbance value; or
identifying a known change in behavior of a component associated with the one or more measurements.

12. The method of claim 8, wherein adjusting the beam divergence of the beam includes increasing the beam divergence proportional to an increase in the plurality of disturbance values.

13. The method of claim 8, wherein adjusting the beam divergence of the beam includes decreasing the beam divergence when the indication exceeds a set threshold.

14. The method of claim 8, further comprising:
receiving, by the one or more processors, an updated indication;
estimating, by the one or more processors, one or more updated disturbance values based on the updated indication; and
adjusting, by the one or more processors, a given component based on the one or more updated disturbance values.

15. A method for adjusting beam divergence, the method comprising:
receiving, by one or more processors, an indication of an amount of pointing error of a beam that is received at a remote communication device during a first timeframe;
estimating, by the one or more processors, a plurality of pointing disturbance values to the communication device for the first timeframe and a second timeframe according to the indication and one or more measurements related to a state of the communication device during the first timeframe, the second timeframe being smaller than the first timeframe, each pointing disturbance value being associated with a set of components of the communication device; and
adjusting, by the one or more processors, a beam divergence of a beam transmitted from the communication device for the communication link based on the plurality of pointing disturbance values.

16. The method of claim 15, wherein estimating the plurality of pointing disturbance values includes:
estimating a first disturbance value by determining an average amount of change of the indication over the second timeframe equal to or on the same order of the first timeframe; and
estimating a second disturbance value may by subtracting the first disturbance value from the indication and then determining an average amount of change of the indication over a third timeframe less than the second timeframe.

17. The method of claim 15, wherein estimating the plurality of pointing disturbance values includes identifying a set of components associated with each pointing disturbance value.

18. The method of claim 17, wherein identifying the set of components includes:
determining that a time constant for a variation of the component is equivalent to the timeframe for an estimated disturbance value;
determining that a detected change in the one or more measurements associated with the component is a most likely cause of an estimated disturbance value; or
identifying a known change in behavior of a component associated with the one or more measurements.

19. The method of claim 15, wherein adjusting the beam divergence of the beam includes increasing the beam divergence proportional to an increase in the plurality of pointing disturbance values.

20. The method of claim 15, wherein adjusting the beam divergence of the beam includes decreasing the beam divergence when the indication exceeds a set threshold.

* * * * *

UNITED STATES PATENT AND TRADEMARK OFFICE
CERTIFICATE OF CORRECTION

PATENT NO. : 10,887,011 B2  
APPLICATION NO. : 16/867814  
DATED : January 5, 2021  
INVENTOR(S) : Lantz et al.

Page 1 of 1

It is certified that error appears in the above-identified patent and that said Letters Patent is hereby corrected as shown below:

In the Claims

Claim 1, Column 14, Lines 18 and 19:
Now reads: "the communication link"; should read -- a communication link --

Claim 8, Column 15, Line 10:
Now reads: "the communication link"; should read -- a communication link --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*